US005995196A

United States Patent [19]

Nishida et al.

[11] Patent Number: 5,995,196

[45] Date of Patent: Nov. 30, 1999

[54] REORDER PROCESSING SYSTEM

[75] Inventors: Shigeki Nishida, Wakayama; Hideoshi Nishikawa, Wakayama-ken, both of Japan

[73] Assignee: Noritsu Koki Co., Ltd, Wakayama-ken, Japan

[21] Appl. No.: 08/998,271

[22] Filed: Dec. 24, 1997

[30] Foreign Application Priority Data

| | | | |
|---|---|---|---|
| Dec. 27, 1996 | [JP] | Japan | 8-350666 |
| Dec. 27, 1996 | [JP] | Japan | 8-350667 |

[51] Int. Cl.[6] ........ G03B 27/52; G03B 37/32

[52] U.S. Cl. ........ 355/40; 355/27

[58] Field of Search ........ 355/27, 38, 40, 355/41, 47–49; 348/96, 97; 396/310, 319

[56] References Cited

U.S. PATENT DOCUMENTS

| | | | |
|---|---|---|---|
| 4,659,213 | 4/1987 | Matsumoto | 355/38 |
| 5,477,353 | 12/1995 | Yamasaki | 358/487 |
| 5,652,618 | 7/1997 | Nanba | 348/96 |
| 5,729,284 | 3/1998 | Ishii et al. | 348/96 |
| 5,742,857 | 4/1998 | Nanba et al. | 396/319 |
| 5,748,287 | 5/1998 | Takahashi et al. | 355/40 |
| 5,790,280 | 8/1998 | Terashita | 358/501 |
| 5,819,103 | 10/1998 | Endoch et al. | 395/821 |
| 5,850,253 | 12/1998 | Inoue et al. | 348/96 |

FOREIGN PATENT DOCUMENTS

| | | | |
|---|---|---|---|
| 5782332 | 11/1955 | Japan . | |
| 52-135721 | 11/1977 | Japan | G03B 27/00 |
| 56-42227 | 4/1981 | Japan | G03B 27/52 |
| 5934261 | 8/1984 | Japan | G03B 27/46 |

OTHER PUBLICATIONS

Derwent Abstract of Japan Patent No. 59–000029.

Derwent Abstract of Japan Patent No. 59–034291.

Patent Abstract of Japan Patent Application No. 59–028163.

Patent Abstract of Japan Patent Application No. 51–073683.

Patent Abstract of Japan Patent Application No. 51–027938.

Patent Abstract of Japan Patent Application No. 60–138469.

Patent Abstract of Japan Patent Application No. 06–264143.

*Primary Examiner*—Safet Metjahic
*Assistant Examiner*—Nguyen Hung Henry
*Attorney, Agent, or Firm*—Fulbright & Jaworski, LLP

[57] ABSTRACT

A negative sheet (1) for storing piece negatives (10) has reorder information recording sections (6) formed thereon for recording reorder information on the piece negatives (10), respectively. A printer/processor (100) determines additional printing conditions for image frames (10*a*) to be additionally printed, based on the reorder information read by a detector (93) from the reorder information recording sections (6) of the negative sheet (1) fed to the printer/processor (100). The piece negatives (10) to be additionally printed are drawn out of the negative sheet (1), and the image frames (10*a*) are printed on printing paper with the additional printing conditions determined.

5 Claims, 11 Drawing Sheets c.-copy or copies

REORDER PROCESSING SYSTEM

BACKGROUND OF THE INVENTION

1. Field of the Invention

This invention relates to a reorder processing technique using a recording medium to record order information for making photographic prints from piece negatives.

2. Description of the Related Art

Generally, a negative film used in taking pictures with a camera is brought to a photo processing agent for simultaneous printing. At a developing laboratory, the negative film is developed and image frames rendered visible are printed on printing paper. The prints and the developed negative film are handed over from the photo processing agent to the customer. Prior to this, the negative film is cut into piece negatives each having four or six frames, and individual piece negatives are put into separate holders or pockets of a negative sheet formed of transparent resin film. To enable the custom to order additional prints with ease, the negative sheet includes white, satin finished areas formed under each holder and corresponding in number to the frames on each negative piece, for entering numbers of additional prints. When ordering additional prints, the customer writes, with a pen, a desired number of prints in the number entering area corresponding to each selected image frame. An operator at the developing laboratory takes the piece negatives out of the holders having the number entering areas filled in with numbers of additional prints to be made, and feeds the piece negatives into a printer to make the required numbers of additional prints. Alternatively, the operator must make additional prints after inputting, through a keyboard, all the numbers written in the additional print number entering areas and the image frame numbers of the negative sheet. However, the numbers written by the customer with a pen are not only difficult to read mechanically (i.e. with an optical, electronic or magnetic reading device), but may be difficult even for the operator at the developing laboratory to confirm with the eyes. To enable the reorder information to be read reliably at the developing laboratory, attempts have been made by the photo processing agent to transcribe the reorder information to a reorder card. In this case, the numbers of image frames to be additionally printed and the numbers of additional prints are read from the reorder card to be inputted to the printer. Thus, the printer reads bar codes in latent images formed on the piece negatives fed therein, and sets the image frames to be additionally printed to an exposing position by using the image frame numbers read and the reorder information inputted from the reorder card.

In any case, in the above conventional transfer of reorder information to the printer, the numbers of additional prints written on the negative sheet and information on positions of image frames to be additionally printed are not inputted directly to the controller inside the printer. This step of transferring reorder information to the printer has been an obstacle to automation of the additional printing process.

SUMMARY OF THE INVENTION

A primary object of this invention is to provide a reorder processing system, in which reorder information read mechanically (i.e. with an optical, electronic or magnetic reading device) from reorder information recording sections of a negative sheet is used by a controller inside a printer to identify positions of the frames to be additionally printed and the numbers of additional prints.

A second object of this invention is to provide a novel negative sheet for use in a reorder processing system to make photographic prints from piece negatives based on reorder information.

The above primary object is fulfilled, according to this invention, by a reorder processing system using a negative sheet for storing piece negatives and having reorder information recording sections formed thereon for recording reorder information on the piece negatives, respectively, wherein additional printing conditions for image frames to be additionally printed are determined based on the reorder information read by a detector from the reorder information recording sections.

With this construction, the numbers of additional prints to be made of image frames on the respective piece negatives may be recorded directly in the reorder information recording sections of the negative sheet storing the piece negatives. Then, by feeding the negative sheet, as it is, to the detector included in a print processing system at a developing laboratory, for example, the reorder information is read from the reorder information recording sections corresponding to the respective piece negatives stored in the negative sheet. In this way, the print processing system grasps the additional printing conditions for the image frames to be additionally printed. The additional printing conditions may include positions on the piece negatives of the image frames to be additionally printed, and numbers of additional prints, for example, Based on this information detected, the piece negatives having image frames to be additionally printed are drawn out, and required numbers of additional prints are formed on printing paper.

Particularly where the detector is provided for a printer/processor operable to draw the piece negatives out of the negative sheet and carry out a printing process therefor, an automated reorder processing system is realized which automatically draws the piece negatives having image frames to be additionally printed out of the negative sheet fed thereto, and prints the image frames on printing paper to make photographic prints.

It is proposed as a preferred embodiment of this invention that the detector is operable to read the reorder information from the reorder information recording sections while the negative sheet stands still. A piece negative drawn out of the negative sheet for a printing operation is returned to the same holder or pocket of the negative sheet again. Therefore, the negative sheet usually is stopped during the printing operation. In the above method, the reorder information is detected by using the time for stopping the negative sheet. In this case, the reading operation is finished quickly if the detector has a detecting area covering the region of the reorder information recording section. If the detecting area of the detector does not cover the region of the reorder information recording section, the detector needs to have a scanning function. As an alternative, the detector may be adapted to read the reorder information while the negative sheet is transported. In this case, the detector may have a detecting length transversely of a transport direction covering the length of the reorder information recording section. Then, even if the detector is the fixed type, all areas of the reorder information recording section are scanned by moving the negative sheet in the transport direction. This contributes to a simplified construction of the detector.

In a particularly preferred embodiment of this invention, the detector is in form of a line sensor extending parallel to the reorder information recording sections, the line sensor having a detecting region for reading the reorder information, the detecting region providing a basis for identifying image frames on the piece negatives to be additionally printed. That is, the detecting area of the line sensor is divided to correspond to the order in which the image frames are arranged on the piece negative. Then, from the area detected by the line sensor, it may be determined to which image frame in the order counted from one end of the piece negative the detected information corresponds. The positions on each piece negative of the image frames to be additionally printed may be accurately recognized without requiring frame numbers formed in bar code latent images, for example.

To fulfill the secondary object noted above, a negative sheet according to this invention has pockets for storing individual piece negatives cut from a negative film and each having a plurality of image frames, and reorder information recording sections for recording reorder information on each image frame, the reorder information being recorded in a predetermined form automatically readable by a detector.

The reorder information recording sections are formed on the negative sheet for recording reorder information in a predetermined form automatically readable by the detector. The detector capable of reading the information recorded in the above form in the reorder information recording sections may be mounted on a printer. Then, by feeding the negative sheet as it is to the printer, the printer can mechanically receive the reorder information on all piece negatives stored in the negative sheet. This feature opens up the possibility of automating the additional printing process.

As a preferred embodiment of this invention, it is proposed that the reorder information is recorded in the reorder information recording sections in a mark sheet mode. In this case, only frames to be filled in the mark sheet mode may be printed on the negative sheet to require little effort on the part of a person filling the frames. Since the detector is already technically mature, the reorder information may be read directly from the negative sheet. This realizes a smooth reorder system for performing an additional printing process.

As another embodiment for recording in the reorder information recording sections, it is also possible to employ a punched card mode if punching of the negative sheet poses no problem. Further, it is possible to employ a magnetic recording mode. In this case, reorder information generally is recorded on magnetic layers formed on the negative sheet by a magnetic recording device on instructions given from the customer to the photo processing agent. In any case, the reorder information recorded in the above recording modes or similar recording modes are reliably read from the negative sheet by the detector, and used in controlling transport of the piece negatives having image frames to be printed, and in setting exposing frequencies.

In a preferred embodiment for providing conveniences in recording the reorder information, the negative sheet further comprises means for canceling at least part of the reorder information recorded in the reorder information recording sections. As one example of the above means, a cancellation mark may be preset for canceling at least part of the reorder information once recorded in the reorder information recording sections. This mark is recorded as associated with the reorder information to be canceled, whereby this reorder information is regarded as canceled. In this way, reorder information recorded by mistake can be canceled with ease. This is an easy canceling operation compared with erasing marks recorded in the mark sheet mode and filling punch holes formed in the punched card mode. It is of course possible to employ a construction for allowing use of a rubber eraser.

In a further preferred embodiment of this invention, each of the reorder information recording sections is divided into a plurality of recording blocks to enable a visual confirmation of the image frames of one of the piece negatives stored in one of the pockets. After selecting an image frame to be additionally printed, the number of additional prints is recorded in a recording block formed in a position corresponding to the image frame, particularly a position that can be visually confirmed. Thus, the number of additional prints may be recorded in a correct position, i.e. a correct block, while confirming a desired image frame on the piece negative stored in the negative sheet. As one preferred arrangement, it is proposed that each of the recording blocks at least partly overlaps a corresponding one of the image frames (strictly speaking, an area of each image frame with reference to the piece negative correctly stored in the pocket of the negative sheet). In this arrangement, each image frame and the corresponding reorder information recording block become two-dimensionally integrated to greatly facilitate a collation therebetween. As another preferred arrangement, it is proposed that each of the recording blocks is arranged around a corresponding one of the image frames. In this arrangement, a relationship between the recording block and image frame is somewhat indistinct since they do not overlap each other. However, there is no possibility of damaging the film by pressing the image frames with a penpoint or the like in time of recording.

There exist cameras for using photographic film in half size as well as full size. This situation is taken into account in one embodiment of this invention, where each of the recording blocks is usable for both full-size image frames and half-size image frames.

The above reorder information on desired image frames recorded in the reorder information recording sections of the negative sheet may comprise only the numbers of additional prints. To realize a thorough-going additional printing service, the negative sheet may include recording areas for recording trimming information and print correction information such as YMCD correction values, as necessary. It will also meet the customers' demand to provide enlargement size recording areas for indicating enlargement sizes.

Other features and advantages of this invention will be apparent from the following description of the embodiments to be taken with reference to the drawings.

DESCRIPTION OF THE PREFERRED EMBODIMENTS

Figure 1:
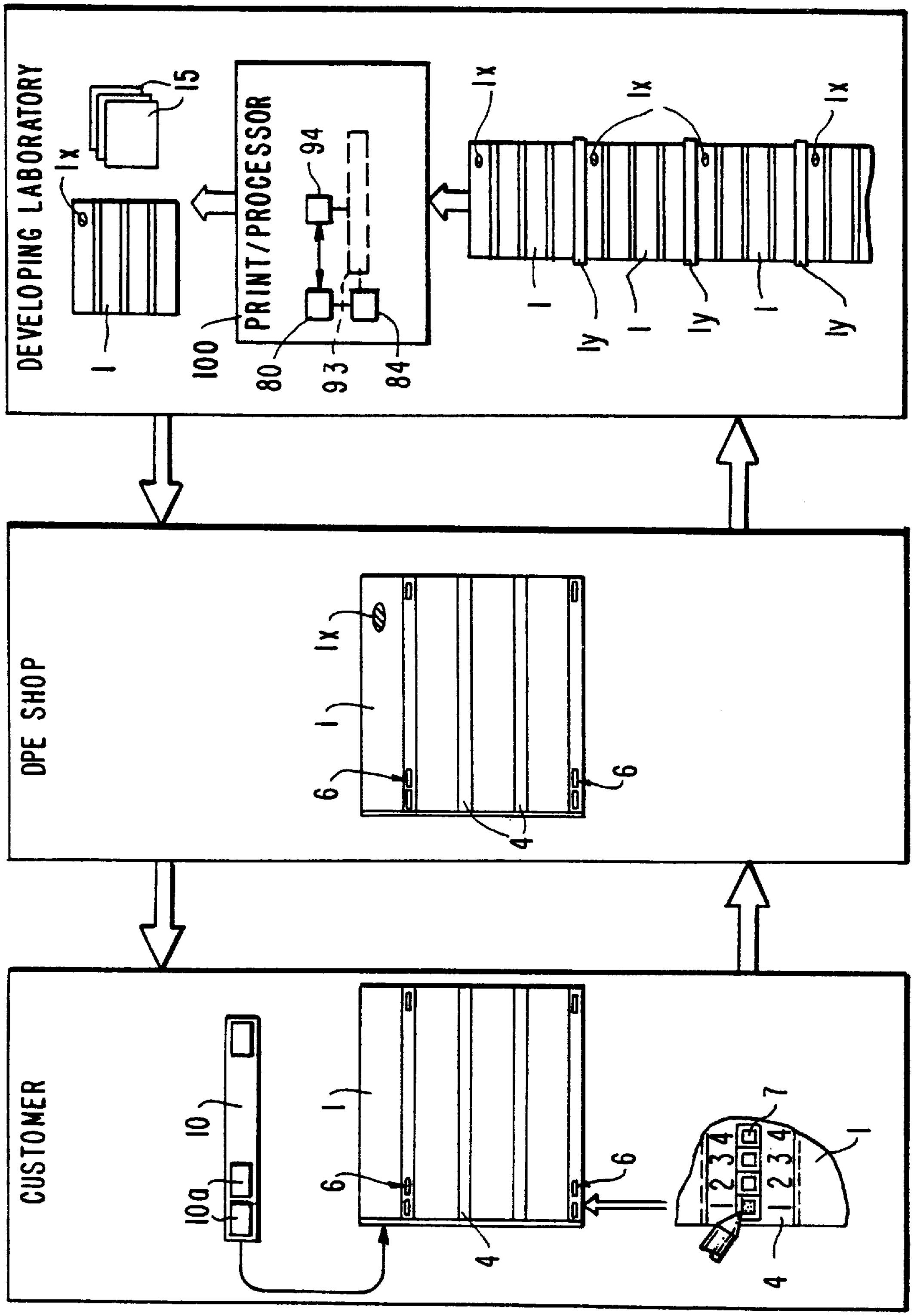
FIG. 1 is a schematic view of a reorder processing system according to this invention.

FIG. 1 shows a concept diagram of a reorder processing system according to this invention. While checking image frames 10*a* formed on piece negatives 10 stored in a negative sheet 1, a customer records numbers of additional prints as reorder information in reorder information recording sections of the negative sheet 1 corresponding to the image frames 10*a* to be additionally printed. The negative sheet 1 with the reorder information recorded thereon is brought to a photo processing agent who performs an order acceptance process such as applying an order ID seal 1*x* to the negative sheet 1. A plurality of negative sheets 1 sent from varied photo processing agents to a developing laboratory are joined with splicing tape 1*y* to form an elongate film to be fed to a printer/processor 100. A detecting device 93 reads the reorder information from the reorder information recording sections of the negative sheets 1 fed to the printer/processor 100. Photographic prints are made by printing desire numbers of desired image frames 10*a* of the piece negatives 10. Finished photographic prints are delivered along with the negative sheets 1 to the customers through the photo processing agents. Thus, with this reorder processing system, reorder information recorded on the negative sheet by the customer is read as it is, without being manually transcribed, by the printer/processor 100 for use in an additional printing process.

The negative sheet 1 and printer/processor 100 used in this reorder processing system will be described in detail hereinafter.

Figure 2:
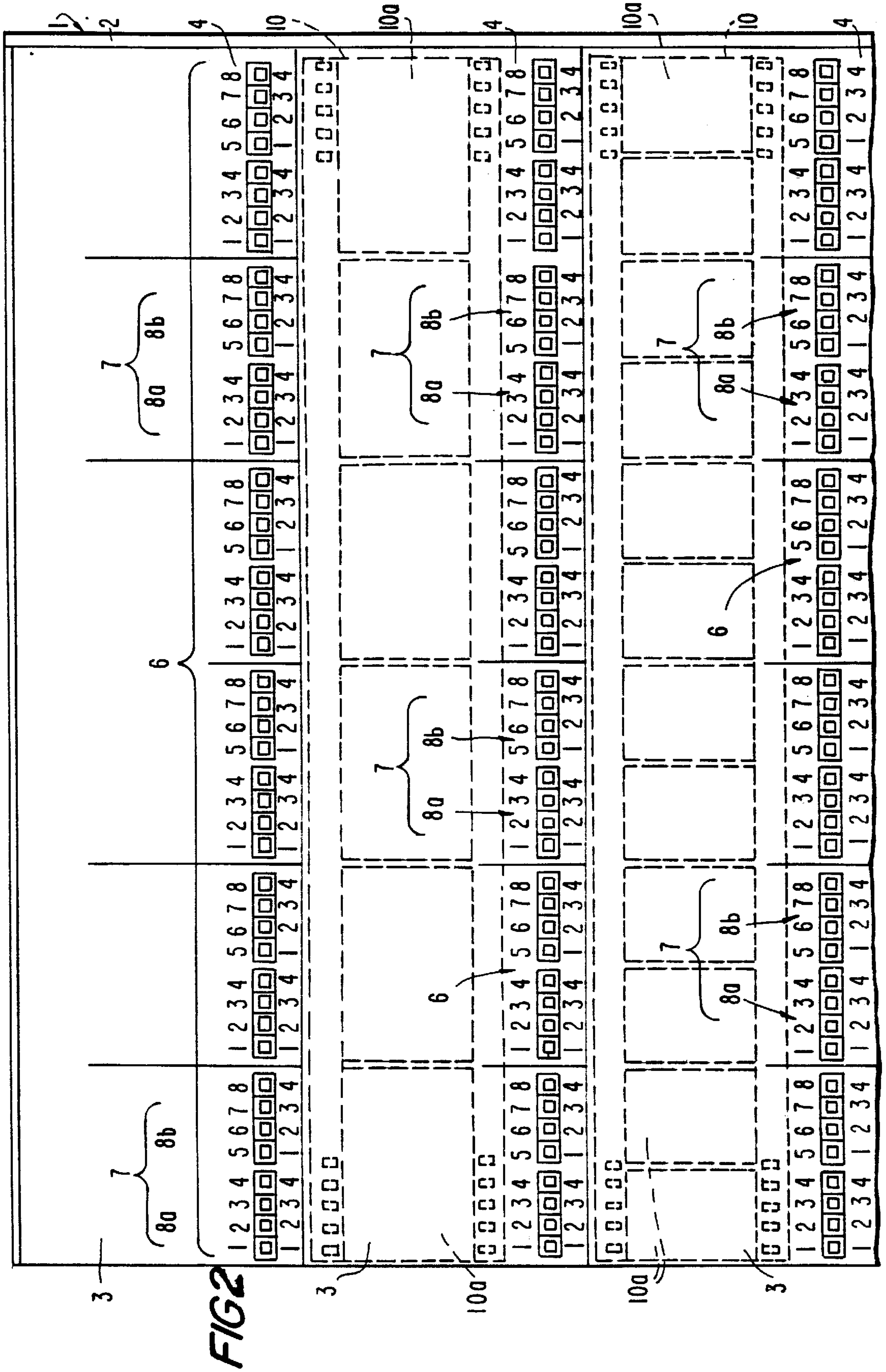
FIG. 2 is a plan view of a negative sheet for use in the reorder processing system in one embodiment of this invention.
Figure 4:
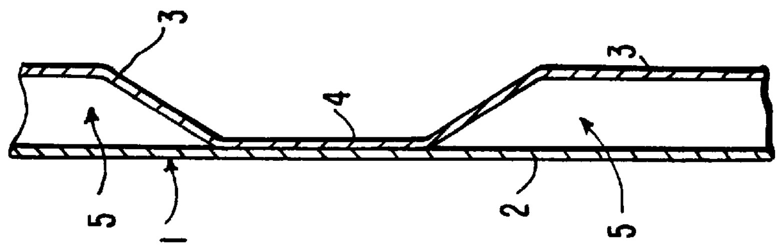
FIG. 4 is a cross section of the negative sheet shown in FIG. 2.
Figure 3:
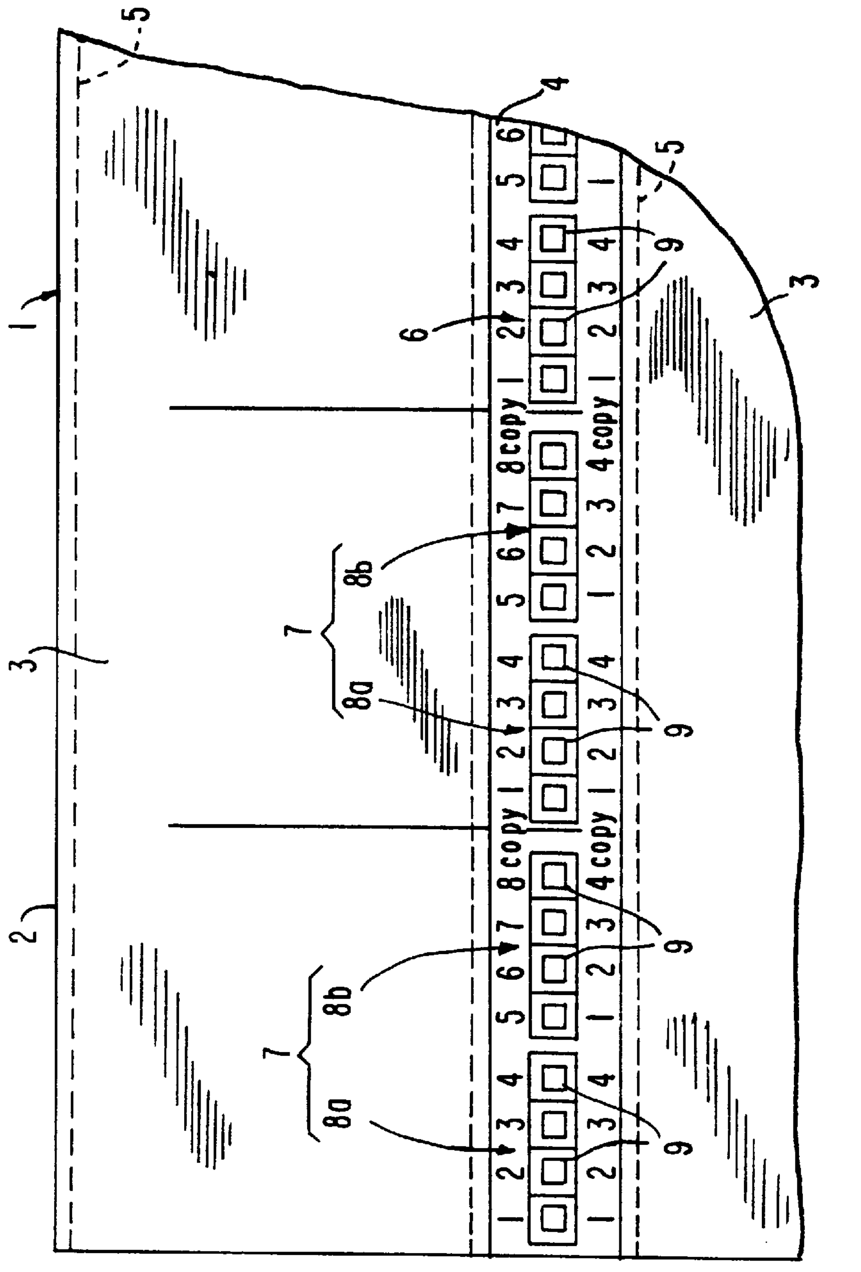
FIG. 3 is an enlarged view of the negative sheet shown in FIG. 2.

FIGS. 2 through 4 show one example of negative sheets 1 according to this invention, on which reorder information may be recorded. The negative sheet 1 has a back sheet portion 2 and a front sheet portion 3 formed by folding a sheet of transparent resin film. The back sheet portion 2 and front sheet portion 3 are bonded together along joining lines 4 arranged at fixed intervals to form holders or pockets 5 between the joining lines 4 for containing piece negatives 10. In FIG. 2, the uppermost pocket 5 is shown empty to facilitate understanding of the relationship between negative sheet 1 and piece negatives 10. The second pocket 5 contains a piece negative 10 having six full-size image frames 10*a*. The third pocket contains a piece negative 10 having 12 half-size image frames 10*a*. However, it is unusual that the same negative sheet 1 should contain piece negatives 10 having full-size image frames and half-size image frames.

The front sheet portion 3 includes belt-like mark sheet areas 6 each formed along a joining line 4 between adjacent piece negatives 10 stored in the pockets 5, to act as a reorder information recording section for recording numbers of additional prints. The mark sheet areas 6 are white, satin finished areas divided into blocks 7 corresponding to the image frames 10*a* on the piece negatives 10 stored. Each block 7 includes a first filling division 8*a* having four void squares 9 printed along the joining line 4 and offset to the left of the corresponding image frame 10*a*, and a second filling division 8*b* having four void squares 9 printed along the joining line 4 and offset to the right of the corresponding image frame 10*a*. Further, numerals 1 to 4 are sequentially printed above the four squares 9 of the first filling division 8*a*, while numerals 5 to 8 are sequentially printed above the four squares 9 of the second filling division 8*b*. These numerals represent numbers of additional prints, and the numeral above a filled square 9 indicates the number of additional prints. When a plurality of squares are filled, a sum of the numerals above those squares indicates the number of additional prints. Thus, when all squares 9 are filled, the number of additional prints is 1+2+ . . . +8=36. Take the piece negative 10 stored in the second pocket 5 in FIG. 2 for example, six additional prints are required of the image frame 10*a* at the extreme right. The numerals printed over the void squares 9 are applicable to negative pieces having full-size image frames 10*a*.

The numerals under the void squares 9 are used to indicate numbers of additional prints for the piece negative 10 having half-size image frames 10*a* and specially stored in the third pocket 5 for the purpose of illustration. Because of the half-size image frames 10*a*, numerals 1 to 4 are printed under both the first filling division 8*a* and second filling division 8*b*. As a result, blocks 7 are provided for all half-size image frames 10*a*.

Figure 5:
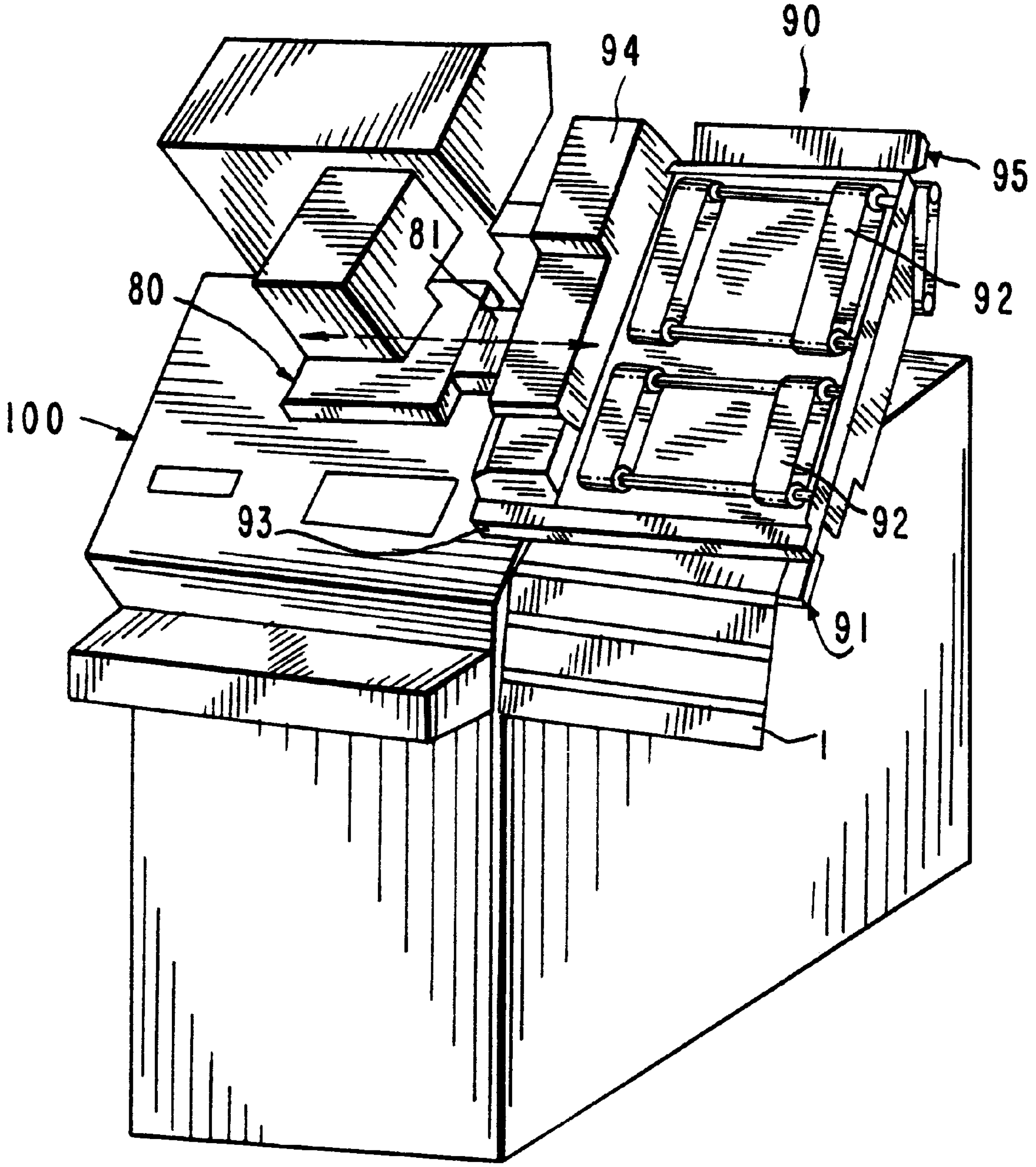
FIG. 5 a perspective view of a printer/processor using the negative sheet according to this invention.

In the reorder processing system using the above negative sheet 1, the customer fills squares 9 corresponding to desired image frames 10*a* and indicating desired numbers of additional prints. The photo processing agent applies an order ID seal 1*x* to the negative sheet 1 with the piece negatives 10 stored in the pockets 5, and forwards the negative sheet 1 to the developing laboratory. The developing laboratory has the printer/processor 100 for making photographic prints 15 by printing image frames 10*a* on printing paper 86 and developing the printing paper 86. FIG. 5 shows an outward appearance of this printer/processor 100. The printer/processor 100 includes an exposing section 80 disposed on a front portion thereof, and a reprint unit 90 disposed to the right of the exposing section 80 for feeding piece negatives 10 from negative sheets to the exposing section 80.

Figure 6:
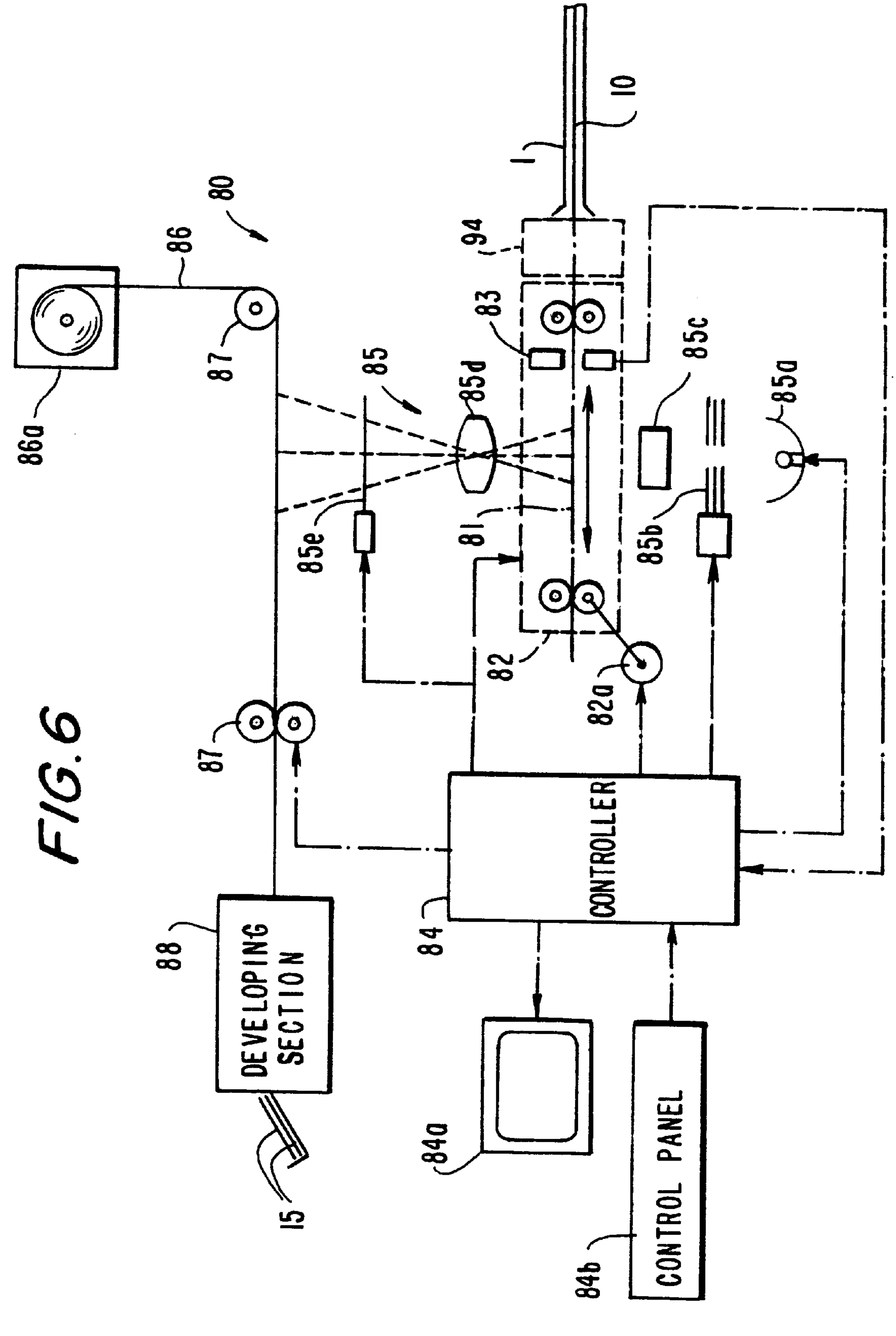
FIG. 6 is a block diagram of an exposing section of the printer/processor.

The exposing section 80 will be described first with reference to the block diagram shown in FIG. 6.

A film transport mechanism 82 defines a film transport line 81 for transporting piece negatives 10 to be printed from the negative sheets to an exposure point 85. A scanner 83 is disposed on the film transport line 81 for reading the image frames 10*a*. The images read are transmitted to a controller 84 for use in determining exposing conditions and for display on a monitor 84*a*. The exposure point 85 includes an exposing light source 85*a*, a light adjustment filter 85*b* for adjusting a color balance of irradiating light emitted from the exposing light source 85*a*, with yellow, magenta and cyan filters movable into and out of an exposing optical path, a mirror tunnel 85*c* for uniformly mixing the colors of the light after the color balance adjustment through the light adjustment filter 85*b*, a printing lens 85*d* for forming images of image frames 10*a* to be printed on the printing paper 86, a shutter 85*e*, and transport rollers 87 for transporting the printing paper 86 from a paper magazine 86*a*. Positions of the filters of the light adjustment filter 85*b*, and an opening time of the shutter 85*e*, i.e. an exposure time, are controlled according to exposing conditions determined by the controller 84. The operator of the printer/processor 100 may observe images displayed on the monitor 84*a*, and input instructions to correct the exposing conditions through a control panel 84*b* unless proper images are obtained. Then, the controller 84 corrects the exposing conditions based on the correcting instructions and determines final exposing conditions. Based on the exposing conditions determined in this way, the controller 84 controls operations of the respective components of the exposure point 85 to project and expose the images of image frames 10*a* of the piece negatives 10 on the printing paper 86 drawn from the paper magazine 86*a*. The controller 84 further controls the film transport mechanism 82 by driving a transport motor 82*a*.

Figure 7:
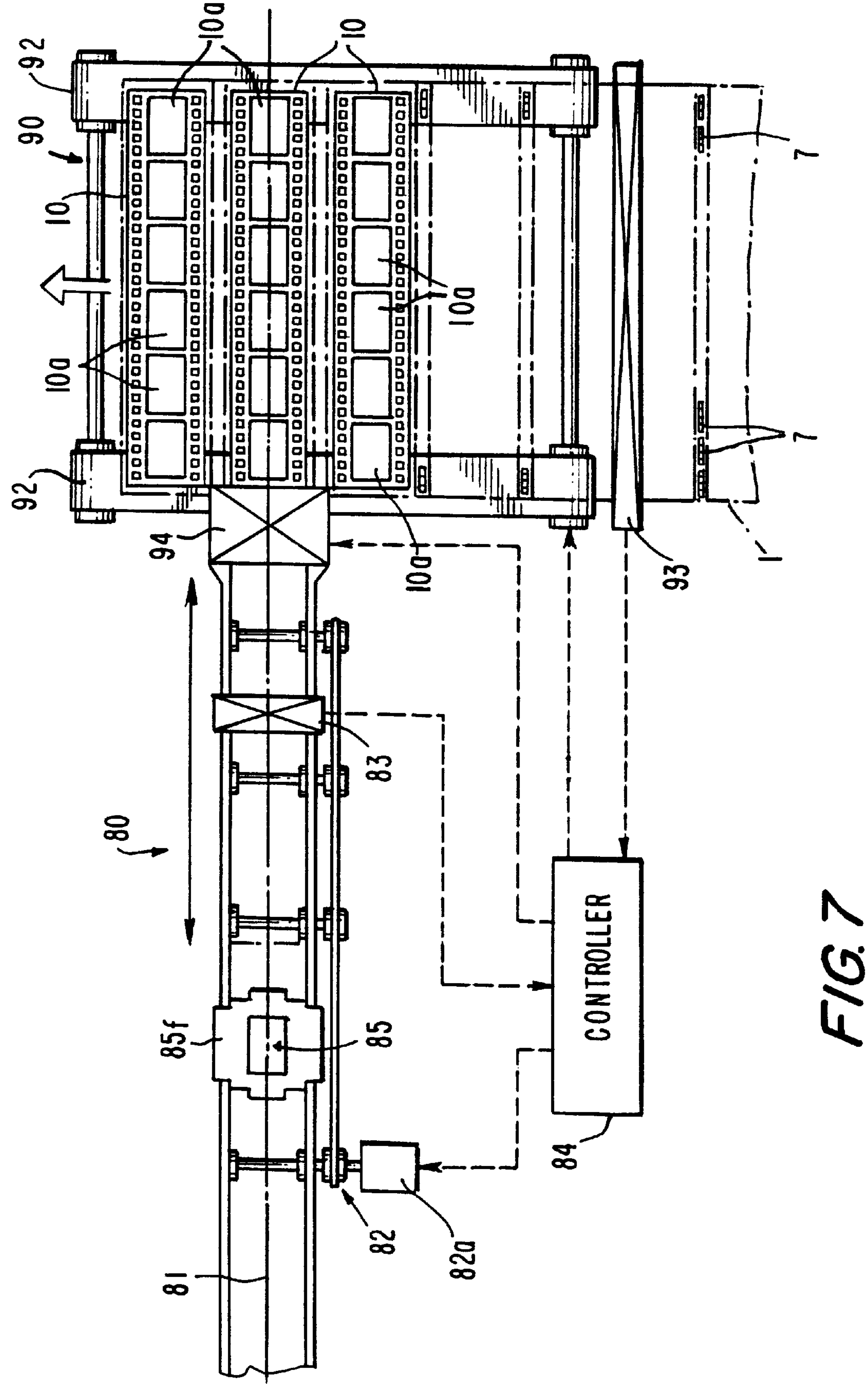
FIG. 7 is a block diagram of a reprinting system using the negative sheet.

The reprint unit 90 will be described next with reference to the perspective view shown in FIG. 5 and the schematic view shown in FIG. 7. The reprint unit 90, based on reorder information recorded on the negative sheet containing piece negatives 10, feeds piece negatives 10 to be printed to the exposing section 80.

The reprint unit 90 includes a loader 91 for a plurality of negative sheets 10 joined together by splicing tape 1*y*, a belt transport mechanism 92 for transversely transporting the piece negatives stored in the negative sheets 10 loaded, an optical sensor 93 for optically scanning the mark sheet areas of the negative sheets 1, and a transport mechanism 94 for transferring piece negatives 10 drawn out of the pockets 5 of the negative sheets 1 to be printed to the film transport mechanism 82 of the exposing section 80, and inserting the piece negatives 10 received from the film transport mechanism 82 into the pockets 5 of the negative sheets 1. The belt transport mechanism 92 and transfer mechanism 94 also are controlled by the controller 84.

The optical sensor 93 is attached with an internal line CCD extending perpendicular to the transport direction of negative sheets 1. When one of the mark sheet areas 6 of negative sheet 1 enters the detection area of this line CCD, the line CCD detects a filled state of the squares 9 arranged in a straight line, and transmits a detection signal to the controller 84. The detection signal from the line CCD is divided into six detection areas for evaluation, which correspond to the blocks 7 of each mark sheet area 6. Each of the detection areas is further divided to correspond to the first division 8*a* and second division 8*b*. Consequently, the controller 84 can determine, from the detection signal of each mark sheet area 6, whether a given mark or square 9 in the division 8*a* or 8*b* of a given block 7 is filled or not, thereby to make the number of prints ordered of the image frames 10*a* selected by the customer. In the embodiment shown in FIG. 6, the transport line 81 for transporting piece negatives 10 to the exposing section 80 is spaced by three piece negatives 10 from the optical sensor 93 upstream with respect to the transport direction of negative sheets 1. Therefore, the belt transport mechanism 92 stops transporting the negative sheets 1 when the piece negative 10 regarded as an object for printing based on an evaluation of the detection signal from the optical sensor 93 reaches the transport line 81 after the three preceding piece negatives 10. Then, the transfer mechanism 94 draws this piece negative 10 from the pocket 5 of negative sheet 1, and passes the piece negative 10 on to the film transport mechanism 82. Next, the position of the piece negative 10 having an image frame 10*a* to be additionally printed, the position of the image frame 10*a* on the piece negative 10 and the number of additional prints are determined there.

The scanner 83, or an optical sensor specially provided though not shown, first measures the length of image frames 10*a* on the piece negative 10 transported by the film transport mechanism 82, to determine whether the image frames 10*a* are half size or full size. The result of this determination, and detection data of the mark sheet read by the optical sensor 93, are used to identify the image frame 10*a* to be additionally printed and to calculate the number of additional prints. That is, in the case of the second negative piece having full-size image frames 10*a* in the example shown in FIG. 2, six additional prints are made of the image frame 10*a* at the forward end (which is the open end of the pocket 5 containing the negative piece). In the case of the third negative piece having half-size image frames 10*a*, two additional prints are made of the image frame 10*a* at the forward end.

The piece negative 10 is transported by the film transport mechanism 82 until the image frame 10*a* to be additionally printed reaches the opening of an auto negative mask 85*f* disposed at the exposure point 85. Then, the image frame 10*a* is printed on the printing paper 86 to make the number of additional prints ordered. After the printing process, the piece negative 10 is inserted back into the pocket of the negative sheet by a reversed sequence. The exposed printing paper 86 is developed and dried in a developing section 88, and thereafter cut and discharged from the developing section 88 as finished prints.

The optical sensor 93 reads a mark sheet area 6 of negative sheet 1 while the above piece negative 10 is drawn out of the pocket 5 of negative sheet 1, printed and inserted back into the pocket 5. That is, in this embodiment, the optical sensor 93 is in the form of a fixed line sensor, and when the negative sheets 1 are stopped for transfer of the piece negative 10 to the film transport line 81, void squares 9 transversely arranged in a straight line to form a mark sheet area 6 located under the optical sensor 93. Thus, the mark sheet area 6 is read while the negative sheets 1 stand still. This reading operation may be performed in various ways, i.e. in a mode for detecting a filled mark in the mark sheet area 6 by scanning action of the optical sensor 93, a mode for detecting a filled mark in the mark sheet area 6 by moving the optical sensor 93 and negative sheets 1 relative to each other, or a mode for moving both the optical sensor 93 and negative sheets 1.

Upon completion of the operation for printing each piece negative, the belt transport mechanism 92 advances the negative sheets 1 by an amount corresponding to the interval between adjacent pockets 5. The negative sheets 1 are ultimately discharged from an outlet 95. Where the optical sensor 93 detects a filled mark in the mark sheet area 6 during transport of the negative sheets 1, the negative sheets 1 are continuously transported until the negative piece 10 to be printed reaches the transport line 81.

An important point of this reorder processing system is that the reorder information such as positions of image frames 10*a* to be additionally printed and the numbers of prints is recorded on the negative sheet 1 storing the piece negatives 10, in the form such as a mark sheet form readable by the printer/processor 100. Thus, desired numbers of additional prints are automatically made of desired image frames 10*a* simply by loading the negative sheet 1 into the printer/processor 100.

Negative sheets 1 in other embodiments of this inventions will be described hereinafter.

Figure 8:
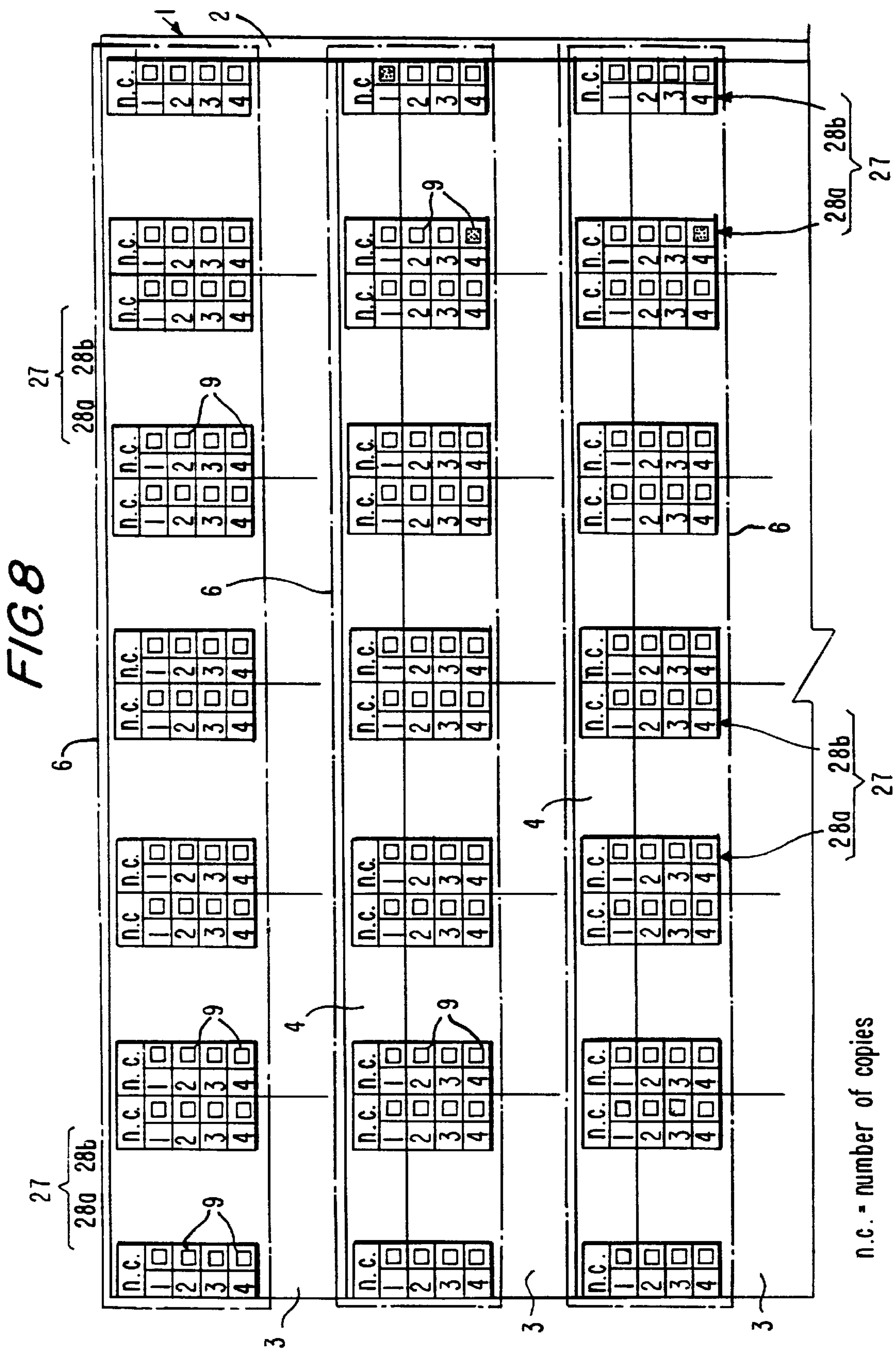
FIG. 8 is a view showing a modified negative sheet.

FIG. 8 shows a negative sheet 1 for recording reorder information in the mark sheet mode, as in the case of the negative sheet shown in FIG. 2. Mark sheet areas 6 acting as reorder information recording sections are formed in regions of the front sheet portion 3 defining pockets 5, and more particularly in regions overlapping upper halves of piece negatives 10 stored in the pockets 5. In this case also, the mark sheet areas 6 are divided into blocks 27 corresponding to the image frames 10*a*. Each block 27 includes divisions opposed to the right and left sides of one of the image frames 10*a*. The left division of the block 27 has a first filling section 28*a* printed thereon, which includes four void squares 9 arranged vertically, and numerals 1 to 4 associated with the void squares 9. The right division of the block 27 has a second filling section 28*a* printed thereon, which includes four void squares 9 and numerals 1 to 4 in mirror symmetry with the first filling section 28*a*.

Where the piece negative 10 stored in a pocket 5 has full-size image frames 10*a* (e.g. the piece negative 10 in the second pocket 5 in FIG. 8), the number of additional prints may be recorded by using both the first filling section 28*a* and second filling section 28*b*. Where the piece negative 10 stored in a pocket 5 has half-size image frames 10*a* (e.g. the piece negative 10 in the third pocket 5 in FIG. 8), the first filling section 28*a* and second filling section 28*b* may, respectively, record the numbers of additional prints for different image frames 10*a* (usually two image frames 10*a*–A and B with the same frame number).

Each filling section of this negative sheet 1 has four void squares 9 arranged vertically, i.e. in the transport direction of negative sheet 1. Thus, the optical sensor 93 for reading the mark sheet areas 6 is in the form of a line sensor which is controllable to detect filled states of all void squares 9 while the negative sheet 1 is transported.

Figure 9:
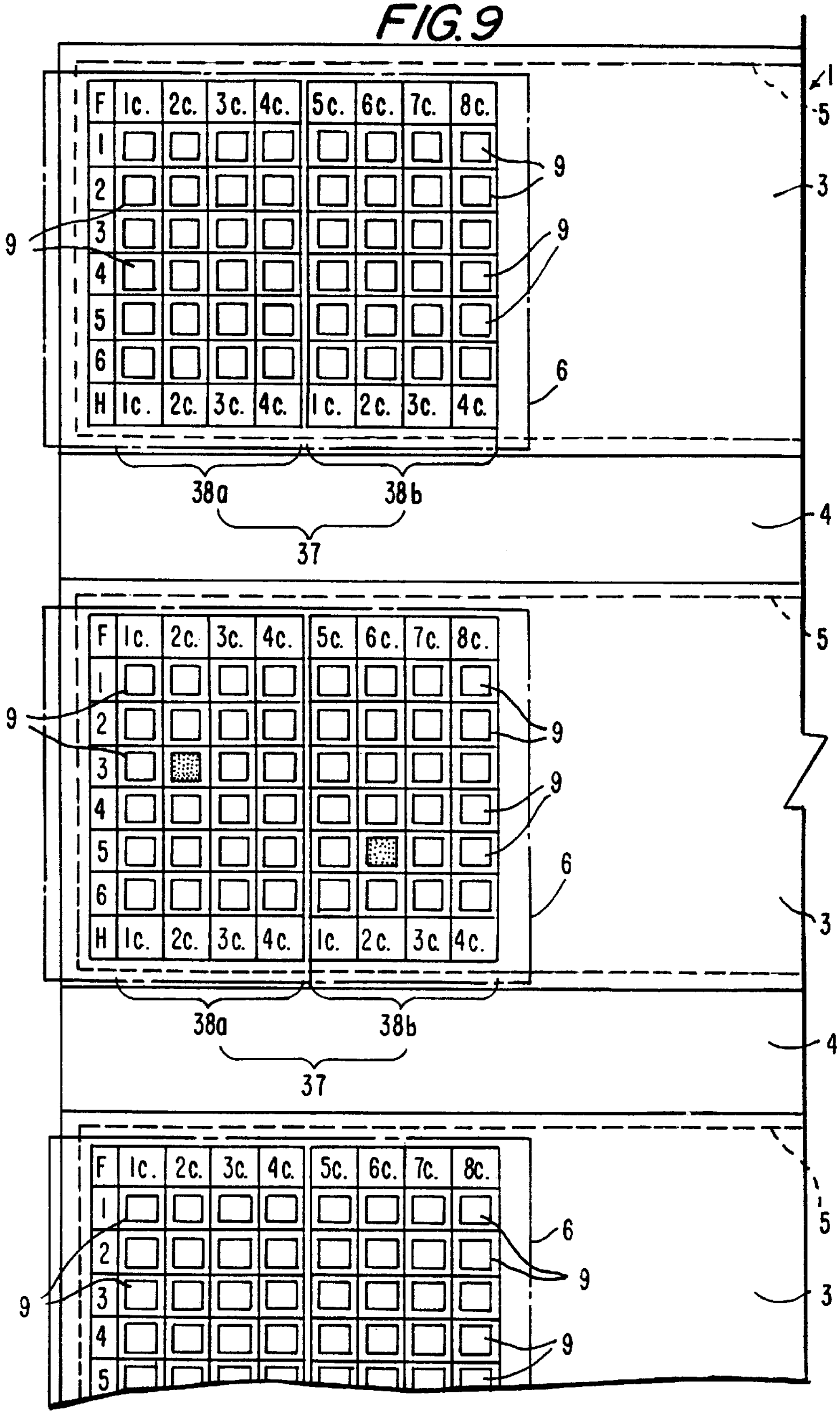
FIG. 9 is a view showing another modified negative sheet.

FIG. 9 shows a negative sheet 1 for recording reorder information also in the mark sheet mode, as in the case of the negative sheet shown in FIG. 2. Mark sheet areas 6 acting as reorder information recording sections are formed in folded end regions of the front sheet portion 3, and more particularly in regions overlapping left ends of piece negatives 10 stored in the pockets 5. In this case also, the mark sheet areas 6 include eight integrated blocks 37. Numerals 1 to 6 printed at the left end indicate corresponding relationships between the blocks 37 and the image frames 10*a* on the piece negative 10 stored. That is, the block 37 with numeral 1 corresponds to the image frame 10*a* at the left end (for the full size). The block 37 with numeral 2 corresponds to the second image frame 10*a* from left (large numerals being used in FIG. 9 to facilitate illustration of the order of frame arrangement). Further, each block 37 has a first filling section 38*a* and a second filling section 38*b* printed therein. The first filling section 38*a* and second filling section 38*b* correspond to the number of additional prints 1 to 8, for the full size, as in the negative sheet 1 shown in FIG. 2. For the half size, each filling section corresponds to the number of additional prints 1 to 4. In FIG. 9, for example, reorder information recorded in the second mark sheet area 6 shows that two additional prints are made of the second image frame 10*a* from left which is indicated by large numeral 2.

Each mark sheet area 6 of this negative sheet 1 includes six rows, each having eight void squares 9 arranged sideways, are arranged in the transport direction of negative sheet 1. Thus, the optical sensor 93 for reading the mark sheet areas 6 is in the form of a line sensor which is controllable to detect filled states of all void squares 9 while the negative sheet 1 is transported. Since the mark sheet areas 6 have a small width, the optical sensor 93 may comprise a line sensor having a small length.

Figure 10:
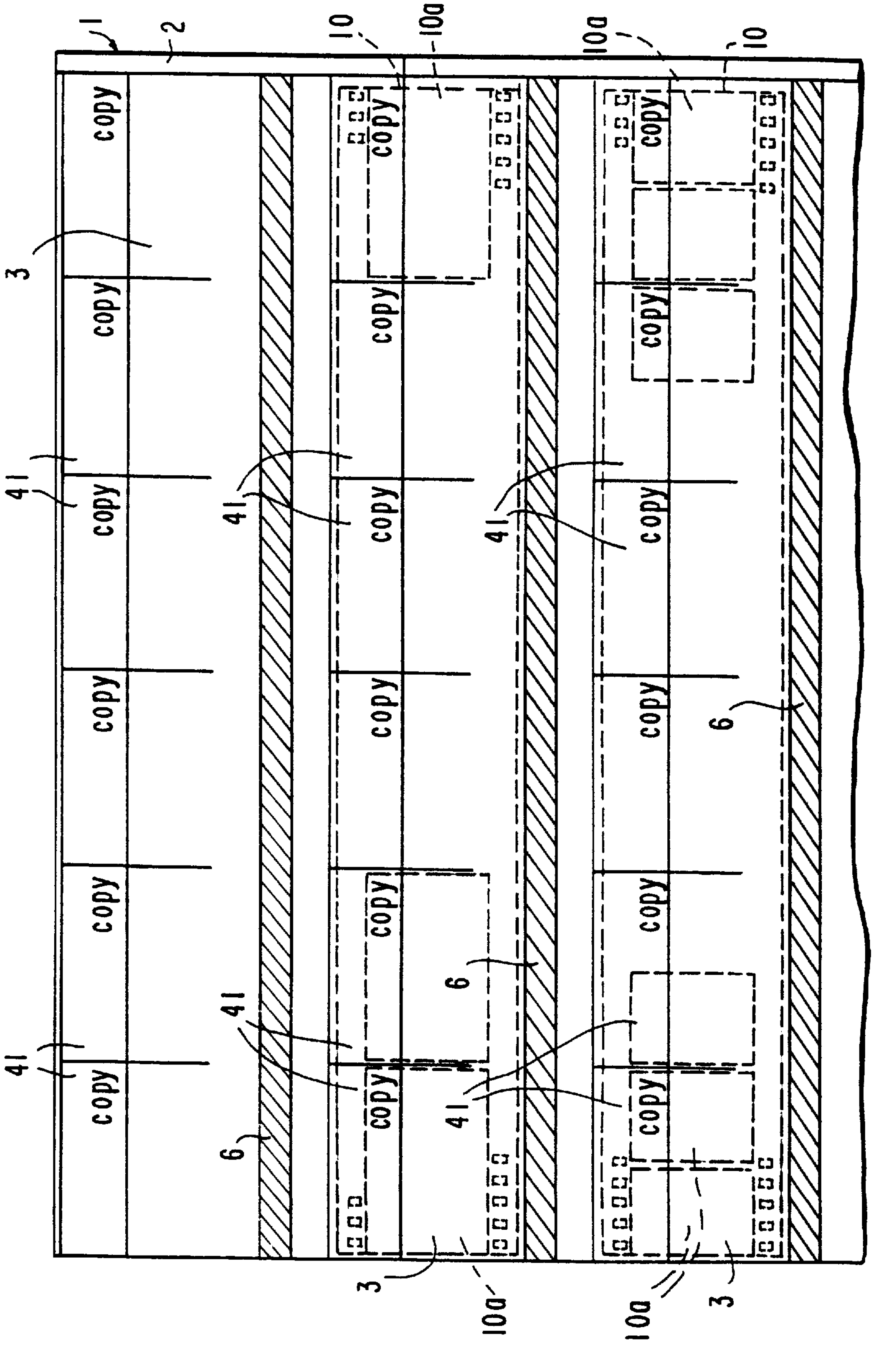
FIG. 10 is a view showing yet another modified negative sheet.

FIG. 10 shows a negative sheet 1 adopting a magnetic recording mode, as opposed to the mark sheet mode of the negative sheet 1 shown in FIG. 2. The mark sheet areas 6 have magnetic layers applied thereto. Reorder information is recorded by a magnetic head, to write data showing positions of image frames 10*a* to be additionally printed, numbers of additional prints, color density levels and so on. The recording by the magnetic head is done by the photo processing agent or at the developing laboratory. The front sheet portion 3 includes fill-in columns 41 formed in positions corresponding to upper parts of piece negatives 10 stored, for the customer to write additional print orders with a pen or the like. In this case, of course, the magnetic head is provided for the printer/processor 100 in place of the optical sensor 93.

Figure 11:
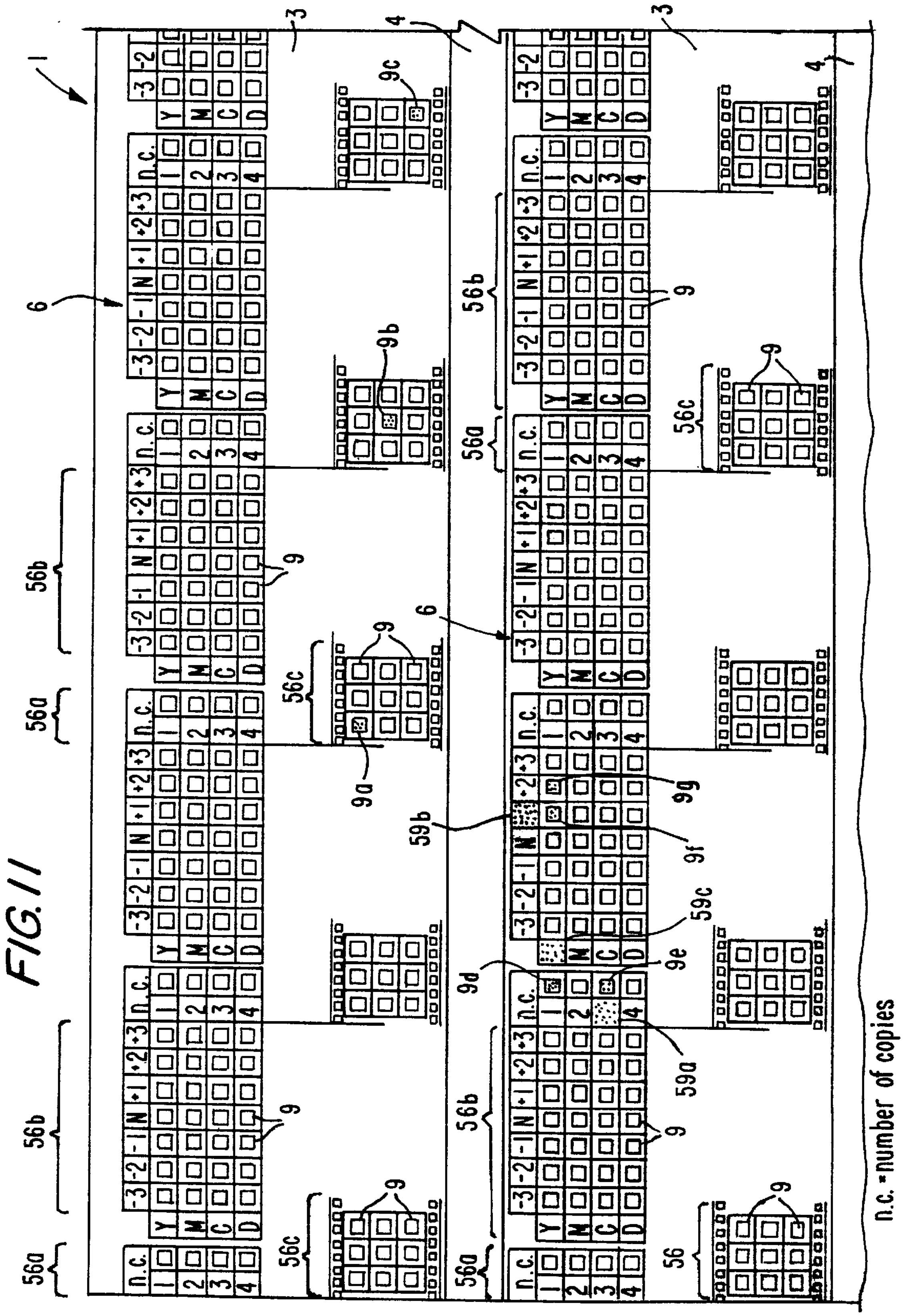
FIG. 11 is a view showing a further modified negative sheet.

FIG. 11 shows a negative sheet 1 including mark sheet areas 6 formed in an upper region and a lower region of each pocket 5. The upper mark sheet area 6 includes first blocks 56*a* for recording numbers of additional prints, and second blocks 56*b* for recording color density information. The lower mark sheet area 6 includes third blocks 56*c* for recording trimming information.

Each of the first blocks 56*a* has, printed therein, four void squares 9 arranged vertically, and numerals 1 to 4 associated with the void squares 9. The numeral to the left of a filled square 9 indicates the number of additional prints.

Each of the second blocks 56*b* has, printed therein, void squares 9 arranged in a 4×7 matrix, signs Y, M, C and D representing yellow, magenta, cyan and density and arranged at the left of the matrix, and signs −3, −2, −1, N (no correction), +1, +2 and +3 indicating correction values and arranged at the top of the matrix. To record cyan and correction value +3, for example, one may only fill the square 9 corresponding to sign C in the vertical direction and sign +3 in the horizontal direction.

Figure 12:
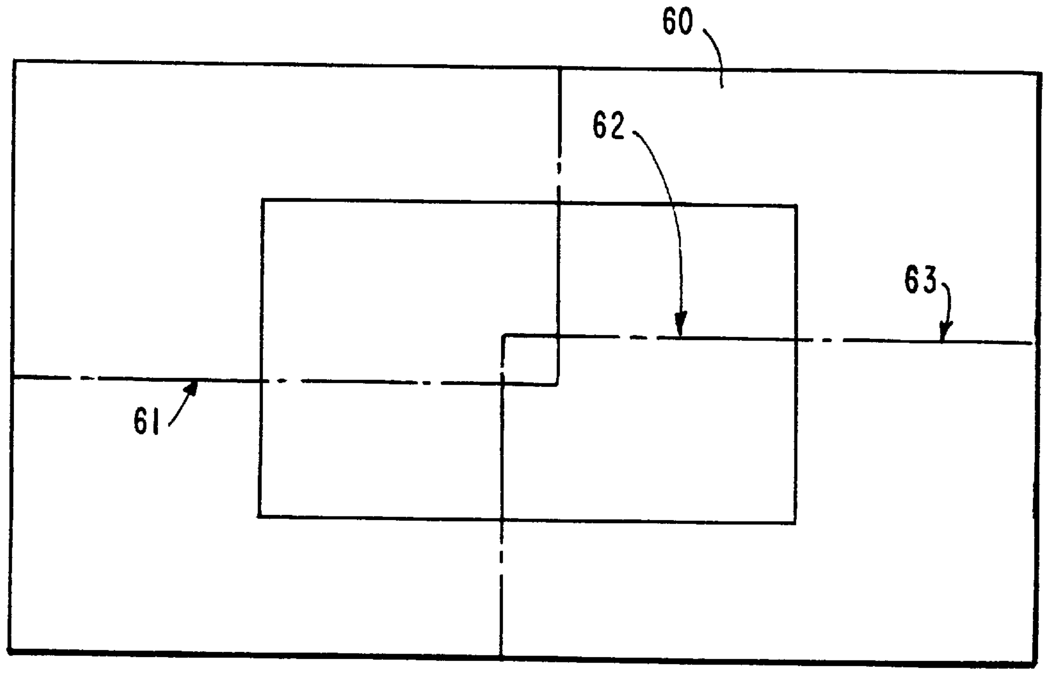
FIG. 12 is an explanatory view of trimming positions.

Each of the third blocks 56*c* has, printed therein, void squares 9 in a 3×3 matrix. This matrix corresponds to the trimming positions shown in FIG. 12. Numeral 60 in FIG. 12 denotes a full-size print screen. Numeral 61 denotes a trimming position moved upward and leftward. Numeral 62 denotes a trimming position in the center. Numeral 63 denotes a trimming position moved downward and rightward. The respective positions correspond to filling of the upper left square 9*a* of the third block 56*c*, filling of the center square 9*b* and filling of the lower right square 9*c*. Other trimming positions may be expressed similarly by using squares 9 in a 3×3 matrix corresponding to nine trimming positions.

Next, how to enter a mark for canceling a once filled mark will be described by using a mark sheet area 6 shown in FIG. 11.

In the first block 56*a* second from left of the second pocket in FIG. 11, the uppermost square 9*d* indicating the number of additional prints (i.e. indicating one print) and the third square 9*e* from top (indicating three prints) are filled, and so is the frame 59*a* of numeral 3. When this numeral frame 59 is filled, the controller 84 of printer/processor 100 regards the number of additional prints as canceled. Consequently, the number of additional prints: 3 is canceled, and the number of additional prints: 1 is made valid by the filling of square 9*d*. A similar cancellation method is possible for the second block 56*b*. In FIG. 11, square 9*f* of +1 for sign Y and square 9*g* of +2 for sign Y are filled, but the +1 frame 59*b* and Y frame 59*c* also are filled. Thus, the correction value of +1 for Y is canceled, and only the correction value of +2 remains effective for Y. The above method of canceling a once filled mark is applicable also to the mark sheet areas 6 of all negative sheets 1 described hereinbefore.

One example of correction method not using such cancellation mark will be described next. Acetate film may be used as film sheet on which data may be written with a pencil, or a seal print may be applied, so that characters and signs written on the surface may be erased with a rubber eraser. Thus, a negative sheet formed of acetate film, and a seal print applied to the surface of the negative sheet, to allow errors in filling the mark sheets to be corrected by using an eraser, constitute an embodiment of this invention as means for canceling at least part of reorder information recorded in the reorder information recording sections.

In the foregoing embodiments, the mark sheet mode and magnetic recording mode are employed as methods of recording reorder information. Where reorder information is detected mechanically (using an optical, electronic or magnetic reading device), various methods may be used, e.g. a punched card mode and application of mark seals.

What is claimed is:

1. A reorder processing system for making photographic prints from piece negatives stored in a negative sheet, comprising:

an exposing section for exposing image frames on said piece negatives onto printing paper;

a negative sheet transport mechanism for transporting said negative sheet;

a detector for reading reorder information from reorder information recording sections formed on said negative sheet;

a film transport mechanism for transporting said piece negatives to said exposing section;

a transfer mechanism for withdrawing said piece negative out of said negative sheet having transported by said negative sheet transfer mechanism, and transferring these piece negatives to said film transport mechanism;

a controller for determining additional printing conditions of the image frames to be additionally printed based on said reorder information read by said detector, and controlling said negative sheet transport mechanism, said transfer mechanism and film transport mechanism to transport piece negatives containing these image frames to said exposing section.

2. A reorder processing system as defined in claim 1, wherein said additional printing conditions include positions on said piece negatives of said image frames to be printed, and numbers of additional prints.

3. A reorder processing system as defined in claim 1, wherein said detector is operable to read said reorder information from said reorder information recording sections while said negative sheet is transported.

4. A reorder processing system as defined in claim 1, wherein said detector is operable to read said reorder information from said reorder information recording sections while said negative sheet stands still.

5. A reorder processing system as defined in claim 1, wherein said detector is in the form of a line sensor extending parallel to said reorder information recording sections, said line sensor having a detecting region for reading said reorder information, said detecting region providing a basis for identifying said image frames on said piece negatives to be additionally printed.

* * * * *